United States Patent
Lu et al.

(10) Patent No.: US 8,443,281 B2
(45) Date of Patent: May 14, 2013

(54) CONSTRUCTING A LABELED TREEMAP WITH BALANCED LAYOUT

(75) Inventors: Hao Lu, Shanghai (CN); Shi Xia Liu, Beijing (CN); Martin M. Wattenberg, Winchester, MA (US); Xi Jun Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 11/733,239

(22) Filed: Apr. 10, 2007

(65) Prior Publication Data

US 2008/0088628 A1 Apr. 17, 2008

(30) Foreign Application Priority Data

Apr. 27, 2006 (CN) .......................... 2006 1 0076095

(51) Int. Cl.
*G06T 11/20* (2006.01)
(52) U.S. Cl.
USPC .......................................... 715/243; 715/244
(58) Field of Classification Search .................. 715/244, 715/246, 247, 243, 788
See application file for complete search history.

(56) References Cited

U.S. PATENT DOCUMENTS

| | | | | |
|---|---|---|---|---|
| 5,590,250 | A * | 12/1996 | Lamping et al. | 345/427 |
| 6,583,794 | B1 * | 6/2003 | Wattenberg | 715/708 |
| 6,820,070 | B2 * | 11/2004 | Goldman et al. | 706/46 |
| 7,027,052 | B1 * | 4/2006 | Thorn et al. | 345/440 |
| 7,076,742 | B1 * | 7/2006 | Thorn et al. | 715/853 |
| 7,509,591 | B1 * | 3/2009 | Thorn et al. | 715/853 |
| 2004/0168115 | A1 * | 8/2004 | Bauernschmidt et al. | 715/500 |
| 2006/0200759 | A1 * | 9/2006 | Agrawala et al. | 715/517 |
| 2007/0090951 | A1 * | 4/2007 | Chan et al. | 340/572.1 |

OTHER PUBLICATIONS

"Tree-Maps: A Space-Filling Approach to the Visualization of Hierarchical Information Structures", by Johnson et al., Dept. of Computer Science & Human-Computer Interaction Laboratory, University of Maryland, College park, MD 20742, p. 284-291.*

"Adaptive Runtime Layout of Hierarchical UI Components", by Keranen et al., VTT Electronics, PO Box 1100, 90571 Oulu, Finland, pp. 251-254.*

"Ordered and Quantum Treemaps: Making Effective Use of 2D Space to Display Hierarchies", University of Maryland at College Park, Maryland), pp. 834-854.*

Bederson et al., Ordered and Quantum Treemaps: Making Effective Use of 2D Space to Display Hierarchies, Oct. 2002, ACM Transactions onGraphics, vol. 21, No. 4, pp. 834-854.*

(Continued)

*Primary Examiner* — Stephen Hong
*Assistant Examiner* — Ahamed I Nazar
(74) *Attorney, Agent, or Firm* — Yudell Isidore Ng Russell PLLC

(57) ABSTRACT

The present invention provides a method and system for constructing a labeled treemap with balanced layout. A range of possible densities of leaf nodes based on designated weights of the leaf nodes and a designated treemap region is determined. A range of possible densities is then searched for a density that could be fitted on and a labeled treemap that could fit on the density. The labeled treemap is presented on a specified display region. By introducing the concept of density into labeled treemap, the present invention ensures the area of region occupied by each leaf node in the constructed labeled treemap is approximately corresponding to the weight of the node, and avoids the case of invisible leaf node in a treemap.

16 Claims, 7 Drawing Sheets

OTHER PUBLICATIONS

Tanaka et al., Treecube: Visualization Tool for Browsing 3D Multimedia Data, 2003, Graduate School of Information Science and Electrical Engineering, Kyushu University, 6-1 Kasuga-koen, Kasuga, Fukuoka 816-8580, Japan, pp. 1-6.*

Bederson et al. Ordered and Quantum Treemaps: Making Effective Use of 2D Space to Display Hierarchies, ACM Transactions on Graphics, vol. 21, No. 4, Oct. 2002, pp. 833-854.*

Ordered and Quantum Treemaps: Making Effective Use of 2D Space to Display Hierarchies by Benjamin B. Bederson et al., University of Maryland, MD, USA, pp. 834-854, published 2002.*

Visualizing Digital Library Search Results with Categorical and Hierarchical Axes by Shneiderman, 2000, pp. 1-9.*

B. Johnson et al., Tree Maps: A Space-Filling Approach to the Visualization of Hierarchical Information Structures, IEEE Computer Society Press, 1991, pp. 284-291.

* cited by examiner

TEST

| ALGORITHMS AND COMPLEXITY | ARTIFICIAL | BIO INF | CPP | ECONOMY |
|---|---|---|---|---|
| LAB 1 | LAB 1 | 48351 | LAB 2 | 48351 |
| SETTINGS | 48351 | | 48351 | |
| 117856 | | | | |
| 48351 | | | | 48351 |
| PROJECT FILES | | | | |
| 48351    80144 | | | | |

CONSTRUCTING A LABELED TREEMAP WITH BALANCED LAYOUT

The present invention relates to the field of data visualization, and particularly to a method and system for constructing a labeled treemap with balanced layout.

TECHNICAL FIELD

The present invention relates to the filed of data visualization, and particularly to a method and system for constructing a labeled treemap with balanced layout.

TECHNICAL BACKGROUND

Along with the development of information technology, various hierarchical data can be found in a wide variety of database-related applications that are coming forth increasingly, including forums, mailing lists, business organization charts, content management categories, and product categories. Hierarchies, also known as tree structures, are collections of multiple data nodes where each node has a single parent, and zero or more child (with the exception of the root node, which has no parent).

Many methods have been proposed to visualize hierarchy data, such as listing, outline, tree diagram, cone tree, hyperbolic tree, treemap, or the like. Among them, treemap has turned into an important way to visualize hierarchy data.

Treemap was first designed by Brian Johnson and Ben Shneiderman during the 1990s. The concept of treemap is introduced in detail in the article "Tree-maps: A SpacFilling Approach to the Visualization of Hierarchical Information Structures" (Proc. IEEE Visualization '91, IEEE, Piscataway, N.J. (1991), 284-291) by Brian Johnson and Ben Shneiderman. Treemap is a way of space-constrained visualization of hierarchical data, and it uses size and color information to represent the attributes of leaf nodes. Treemap enables users to compare nodes and sub-trees at varying depth in the tree, thereby helping them recognize the complete structural information of the tree.

Treemap is highly effective in visualizing large hierarchical collections of quantitative data. A treemap divides the display region into a nested sequence of rectangles (corresponding regions of nodes) representing the hierarchy, wherein the areas of the rectangles correspond to some quantity (e.g. weight) in the hierarchical data set. FIG. 1 shows an example of a treemap.

A method for calculating the layout of the rectangles in treemap is very important to the application of treemap. Several treemap layout methods have been addressed. However, these existing treemap layout methods cannot achieve a perfect effect while handling a labeled treemap. Labeled treemap is different from a conventional treemap in that the rectangles corresponding to respective non-leaf nodes in the labeled treemap contain a part of spaces for their names and borders. By the labels, the new treemap makes it efficient for users to find the data they are interested in, which is a great improvement on the conventional treemap.

However, compared with a conventional treemap, the labeled treemap introduces a greater complexity into its construction process. In constructing a labeled treemap, since the labels and borders occupy the spaces that were originally belonging to corresponding nodes, and the existing treemap layout methods fail in determining the spaces required for the respective labels and borders before constructing, it is only possible that the regions of the nodes are firstly divided in the designated region, then the regions of the labels and borders are divided in the node regions, during the construction process. Thus, such case may arise: if the weights of two non-leaf nodes are equal, then two rectangles with the same area will be divided for the two nodes by the conventional method, herein it is assumed that the length and width of the two rectangles are selected in different coordinate directions, wherein the long side of one is along the x axis, while the short side of the other one is along the x axis. As the heights of labels are the same, the label in the former rectangle will occupy a larger region, so the remaining space for dividing to its child nodes will be smaller than that of the other rectangle. This will result in that not all the region sizes of the nodes are corresponding to the weights of the nodes in the constructed treemap, such that the treemap layout is not balanced. In the worst case, even such case may arise: at the end of the dividing for the constraint region by these existing treemap layout methods, there may be no more space to arrange the remaining leaf node with smaller weight, so that such leaf node is invisible in the constructed treemap.

Therefore, there is a need for a new method for constructing a labeled treemap with balanced layout, in order to solve such problems.

SUMMARY OF THE INVENTION

The present invention is proposed in view of the above-mentioned problems in the prior art. Its objective is to provide a method and system for constructing a labeled treemap with balanced layout, so that the area of region occupied by each leaf node in the constructed labeled treemap corresponds to the weight of the node, and the case of leaf nodes being invisible in the labeled treemap is avoided.

According to an aspect of the present invention, there is provided a method for constructing a labeled treemap with balanced layout, comprising:

determining a range of possible densities of leaf nodes based on designated weights of the leaf nodes and a designated treemap region, wherein the density of a leaf node is the area of region on one unit of weight occupied by the leaf node;

searching the rang of possible densities for a density that could be fitted on and a labeled treemap that could fit on the density, wherein said density that could be fitted on is referred to that there is at least a labeled treemap for the density in which the area of region occupied by each leaf node is at least the product of the weight of the node and the density; and presenting the labeled treemap on the specified display region.

Preferably, the searching step further comprises: searching the range of possible densities for a maximum density that could be fitted on and a labeled treemap that could fit on the maximum density.

Preferably, the searching step further comprises: selecting a density from the range of possible densities; attempting, based on the hierarchy, possible splitting manners for constructing a labeled treemap with respect to the designated treemap region; determining whether one of the possible splitting manners is able to construct a labeled treemap that could fit on the density; if it is able to construct a labeled treemap that could fit on the density, then constructing a labeled treemap by utilizing the splitting manner, and the density and the labeled treemap being the result of searching, otherwise continuing to search in the range of possible densities.

Preferably, the searching step further comprises: performing the following steps by using a search method: selecting a density from the range of possible densities; attempting, based on the hierarchy, possible splitting manners for constructing a labeled treemap with respect to the designated treemap region; determining whether one of the possible splitting manners is able to construct a labeled treemap that could fit on the density; if it is able to construct a labeled treemap that could fit on the density, then determining the density could be fit on and continuing to search in the range of possible densities towards the upper bound, otherwise to search in the range of possible densities towards the lower bound, until there does not exist a next available density for selecting in the range of possible densities; and determining the last density determined could be fitted on when the searching is finished as the maximum density that could be fitted on in the range of possible densities, and constructing a labeled treemap by utilizing the splitting manner that could construct a labeled treemap that could fit on the density.

Preferably, the determining step further comprises: for each of the possible splitting manners: calculating actual density of each leaf node by dividing the actual area of region assigned to the leaf node by the weight of the node; comparing the actual density of each leaf node with the selected density; and if the actual densities of all leaf nodes are larger than or equal to the selected density, then determining such splitting manner could construct a labeled treemap that could fit on the selected density.

Preferably, the determining step further comprises: for each of the possible splitting manners, if it is compared that the actual density of a certain leaf node is smaller than the selected density, then ceasing to compare the actual densities of other leaf nodes.

According to another aspect of the present invention, there is provided a system for constructing a labeled treemap with balanced layout, comprising: a density range determination module for determining a range of possible densities of leaf nodes based on the designated weights of the leaf nodes and a designated treemap region, wherein the density of a leaf node is the area of region on one unit of weight occupied by the leaf node; a density/labeled treemap calculation module for searching the rang of possible densities determined by the density range determination module for a density that could be fitted on and a labeled treemap that could fit on the density, wherein said density that could be fitted on is referred to that there is at least a labeled treemap for the density in which the area of region occupied by each leaf node is at least the product of the weight of the node and the density; and a presentation module for presenting the labeled treemap determined by the density/labeled treemap calculation module on the specified display region.

Preferably, the density/labeled treemap calculation module searches the range of possible densities determined by the density range determination module for a maximum density that could be fitted on and a labeled treemap that could fit on the maximum density.

The solution provided by the present invention may be combined with any existing treemap layout method. By introducing the concept of density into labeled treemaps and searching the range of possible densities for a density that could be fitted on and its corresponding labeled treemap layout, not only does the present invention ensure the area of region occupied by each leaf node in the constructed labeled treemap is approximately corresponding to the weight of the node, but also is able to avoid the case of invisible leaf node in the treemap. In addition, in the preferred embodiment of the present invention, by searching the range of possible densities for a maximum density that could be fitted on and its corresponding labeled treemap layout, it may ensure the best balanced layout of the constructed labeled treemap. Therefore, the present invention solved the problem that the existing treemap layout method cannot make the area of region of each node in labeled treemap correspond to the weight of the node due to the labels and borders needing to occupy space that originally belonged to corresponding weight in the data set.

BRIEF DESCRIPTION OF THE DRAWINGS

It is believed that through the following detailed descriptions of the particular implementations of the present invention, when taken in conjunction with the drawings, the above-mentioned features, advantages, and objectives of the present invention will be better understood.

DETAILED DESCRIPTION OF THE INVENTION

For a full understanding of the present invention, prior to the description of preferred embodiments of the present invention, the concept of treemap is first briefly introduced.

Figure 1:
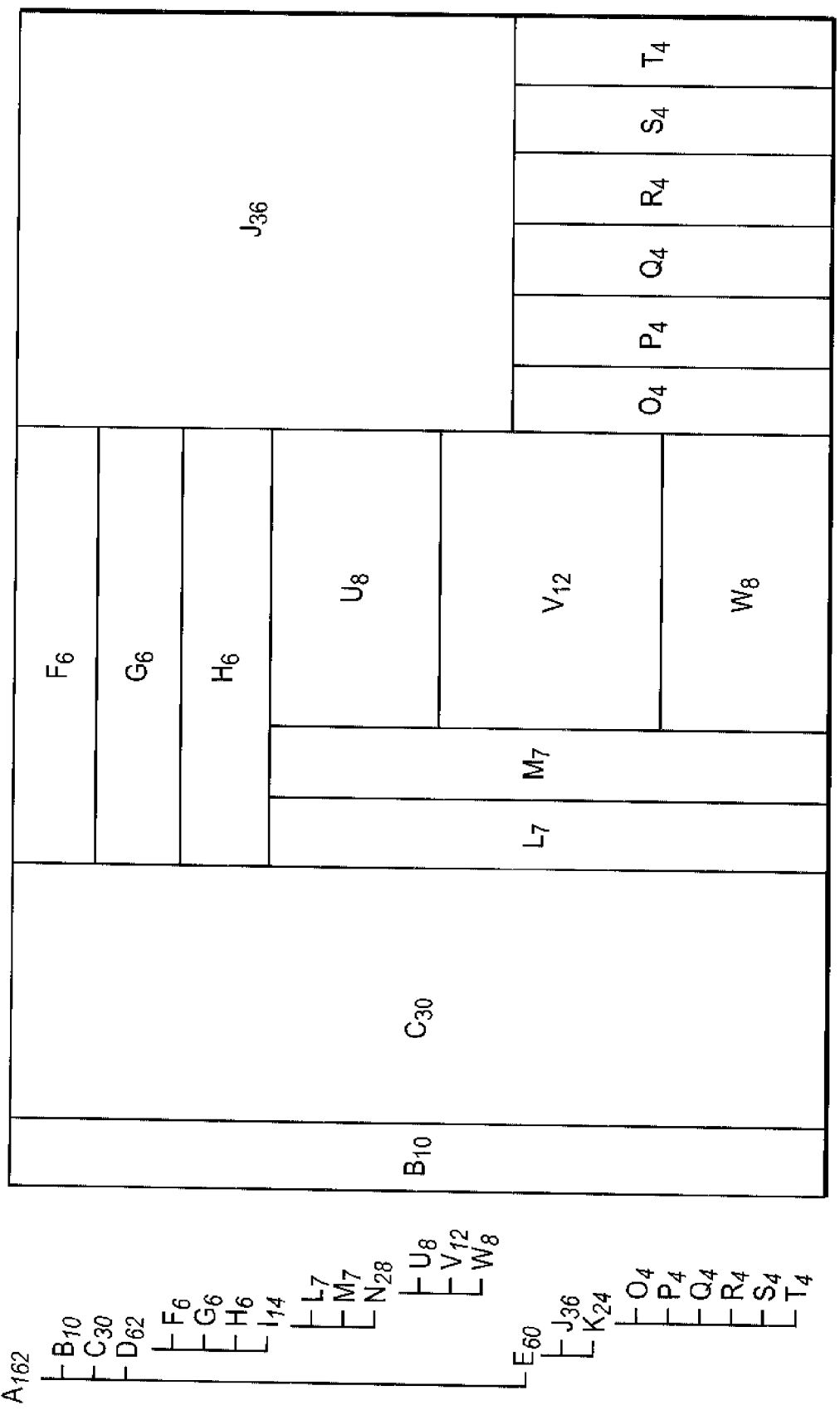
FIG. 1 shows an example of a conventional treemap.

A conventional treemap maps hierarchical information into a 2D representation of rectangles in the fashion of space filling, and divides the display space into a nested sequence of rectangles representing the tree structure. In particular, a treemap divides the designated treemap region into a set of regions representing the top nodes in the hierarchy, then divides each of the divisional region recursively. In addition, while performing the division, the treemap determines the size of the region assigned for each node based on the weight of the node. That is, the part containing more important information in the hierarchy can be assigned more display space, while the relatively less important part can be assigned less. In a treemap, a sibling relation in the hierarchy is mapped into a mutually exclusive relation of rectangle regions except for the border between them, while a parent-child relation is mapped into a containing relation of rectangle regions. FIG. 1 shows an example of a conventional treemap.

In the following, an algorithm depicting a conventional treemap described in the article "Tree-maps: A Space-Filling Approach to the Visualization of Hierarchical Information Structures" by Brian Johnson and Ben Shneiderman is given as reference:

```
DrawTree ( )
{   doneSize=0;
    PaintDisplayRectangle( );
    switch (myOrientation ) {
            case HORIZONTAL:
                startSide=myBounds.left;
            case VERTICAL:
                startSide=myBounds.top;
        }
        if (myNodeType==Internal ) {
            ForEach(childNode) Do {
                    childNode=SetBounds(startSide,doneSize,myOrientation);
                    childNode->SetVisual( );
                    childNode->DrawTree( );
}}}
    SetBounds(startSide, doneSize, parentOrientation);
        { doneSize=doneSize+mySize;
            switch(parentOrientation) {
                case HORIZONTAL:
                    myOrientation=VERTICAL;
                    endSide=parentWidth+doneSize/parentSize;
                    SetMyRect(startSide+offSet, ParentBounds.top+offset,
                            ParentBounds.left+endSide-offSet, ParentBounds.bottom-offSet);
                    StartSide=parentBounds.left+endSide;
                case VERTICAL:
                    myOrientation=HORIZONTAL;
                    endSide=parentHeight+doneSize/parentSize;
                    SetThisRect(parentBounds.left+offSet, startSide+offSet,
                            parentBounds.right-offSet, parentBounds.top+endSide-offSet);
                    startSide=parentBounds.top+endSide;
}}
```

Currently, there exist a plurality types of treemaps derived from the base of conventional treemap. Labeled treemap is one of them.

Figures 2, 4:
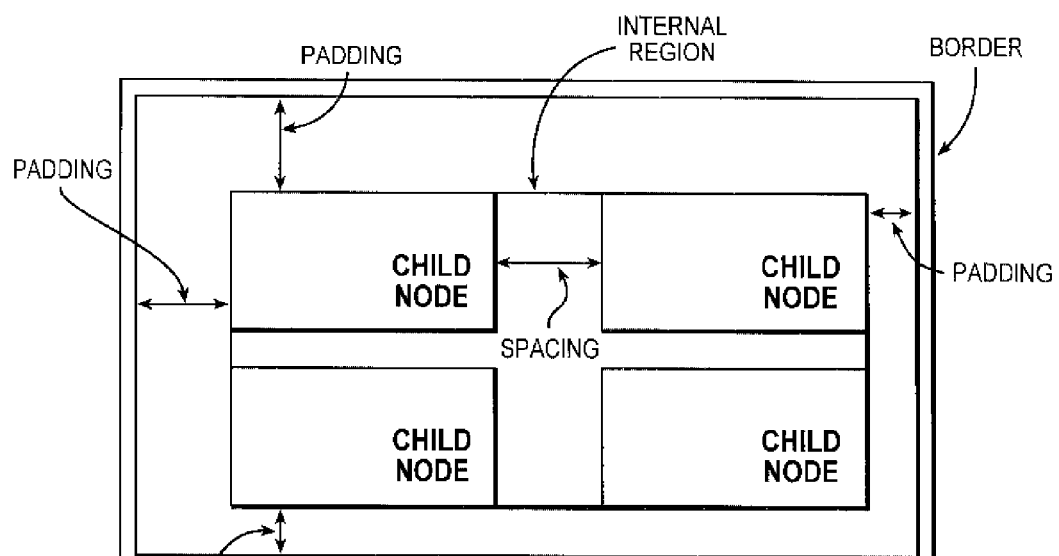
FIG. 2 shows an example of a labeled treemap for visualizing file hierarchy on a hard drive.
FIG. 4 is the explaination of the layout of a labeled treemap.

FIG. 2 shows an example of a labeled treemap for visualizing file hierarchy on a hard drive, wherein the padding colors are corresponding to the date information of files, and the borders represent directories. With such layout manner, an overview of the whole hierarchy and the contents thereof can be obtained by the viewers, without relying on abundant written descriptions.

Figure 3:
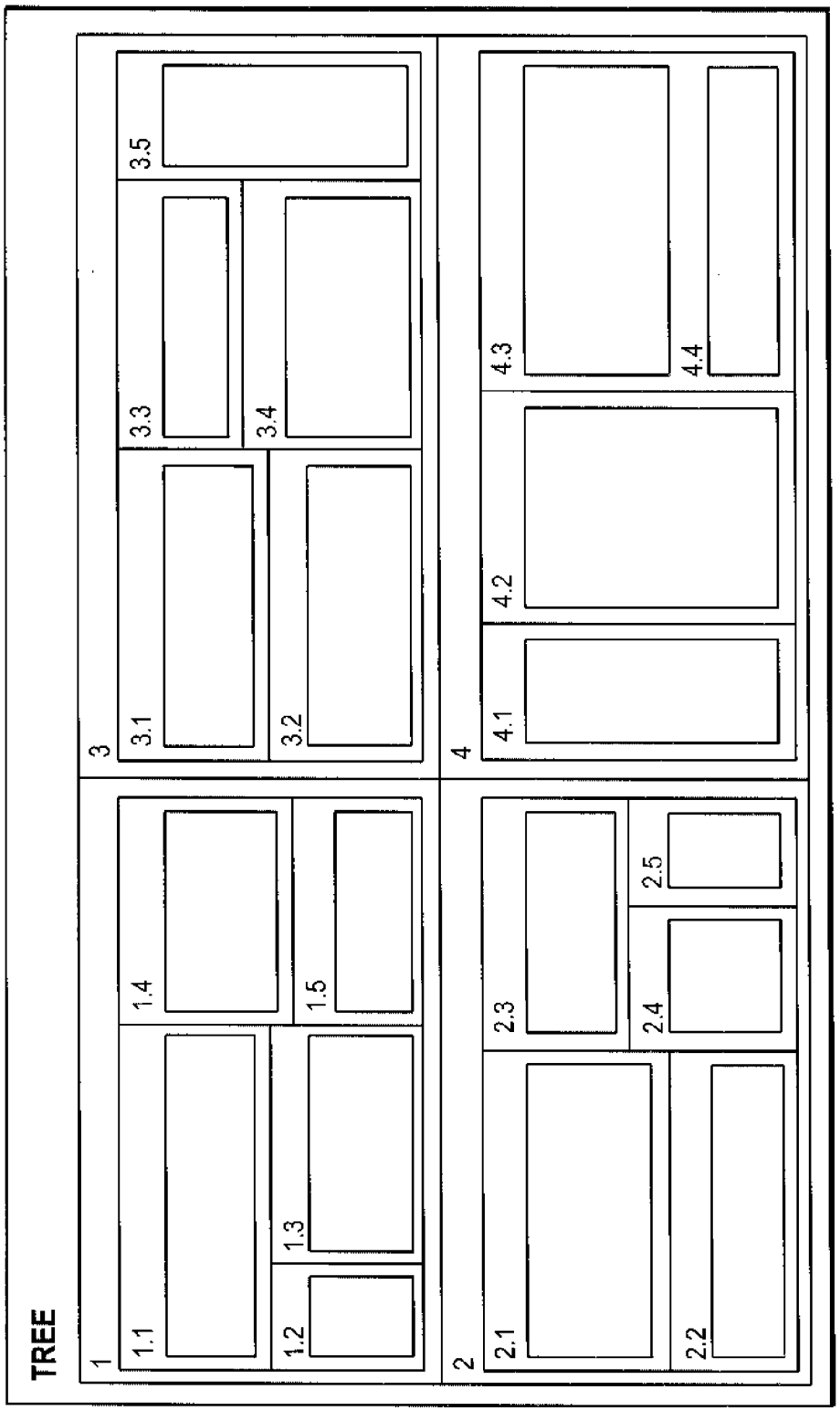
FIG. 3 shows another example of a labeled treemap.

FIG. 3 shows another example of a labeled treemap. As shown in FIG. 3, the root node of the tree structure presented by the treemap is named "Tree", which has four child nodes, named "1", "2", "3" and "4" respectively, each of which has their own child nodes. In the treemap, the child nodes are named following the index convention of book sections. Additionally, the names of the leaf nodes are ignored in FIG. 3.

FIG. 4 is the explanation of the layout of a labeled treemap. As shown in FIG. 4, in the labeled treemap, the border, spacing and padding occupy a part of space that is originally belonging to the rectangle regions of corresponding nodes in the hierarchy. Wherein, borders are used for spacing different node regions, and spacing are used for displaying name, title etc. of the nodes. The existing treemap layout algorithms, however, are generally directed to the conventional treemap. For a labeled treemap, since the existing treemap layout algorithms fail in making the area of rectangles well correspond to the respective weight, it is difficult from the treemaps generated by these existing algorithms to accurately recognize the hierarchy information to be presented. Even such case may arise: these existing treemap layout algorithms may, during the process of construction of a labeled treemap, make some node correspond to a meaningless rectangle region whose height or width is less than zero, thereby being invisible in the generated treemap.

Figure 5:
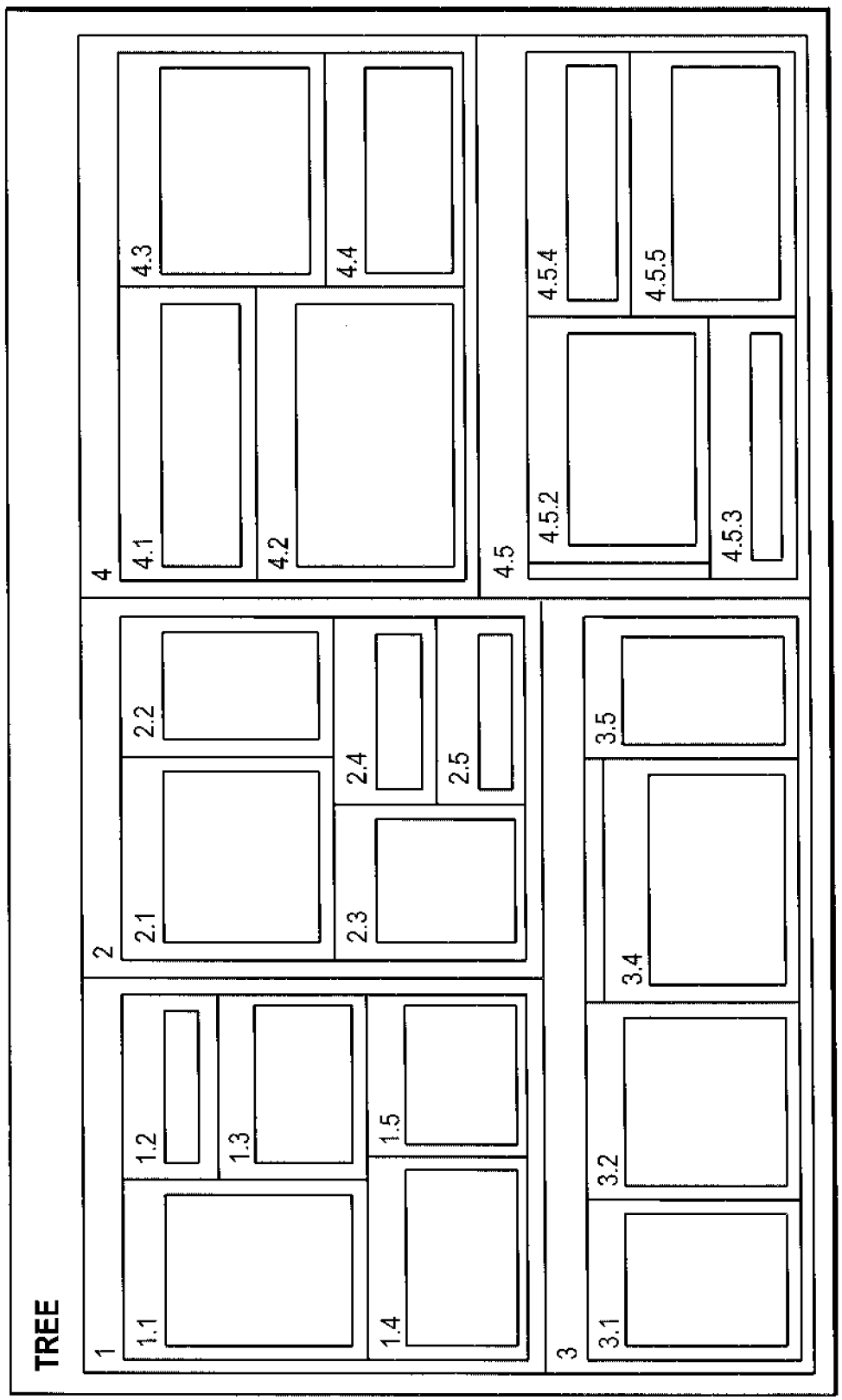
FIG. 5 shows another example of a labeled treemap.

FIG. 5 shows such a treemap. In FIG. 5, since the child node "3.3" and the child node "4.5.1" are corresponding to the meaningless rectangle regions whose height or width is less than zero, they are missing in the treemap. Also, it can be seen by observation that the areas occupied by the leaf nodes do not well correspond to their weights.

Therefore, the present invention proposes a method for constructing a labeled treemap with balanced layout.

Prior to the detailed description of the method of the present invention, two concepts introduced by the present invention are first defined:

The density of a leaf node p: the area of region in a labeled treemap on one unit of weight occupied by the leaf node;

a treemap fitting on density ρ: for each leaf node in a labeled treemap, if it has a weight $w_i$, and the area it occupies is at least $ρ×w_i$, then the labeled treemap is fit on the density ρ.

The method for constructing a labeled treemap with balanced layout in the present invention is described in details in the following, taken in conjunction with the accompanying figures.

Figure 6:
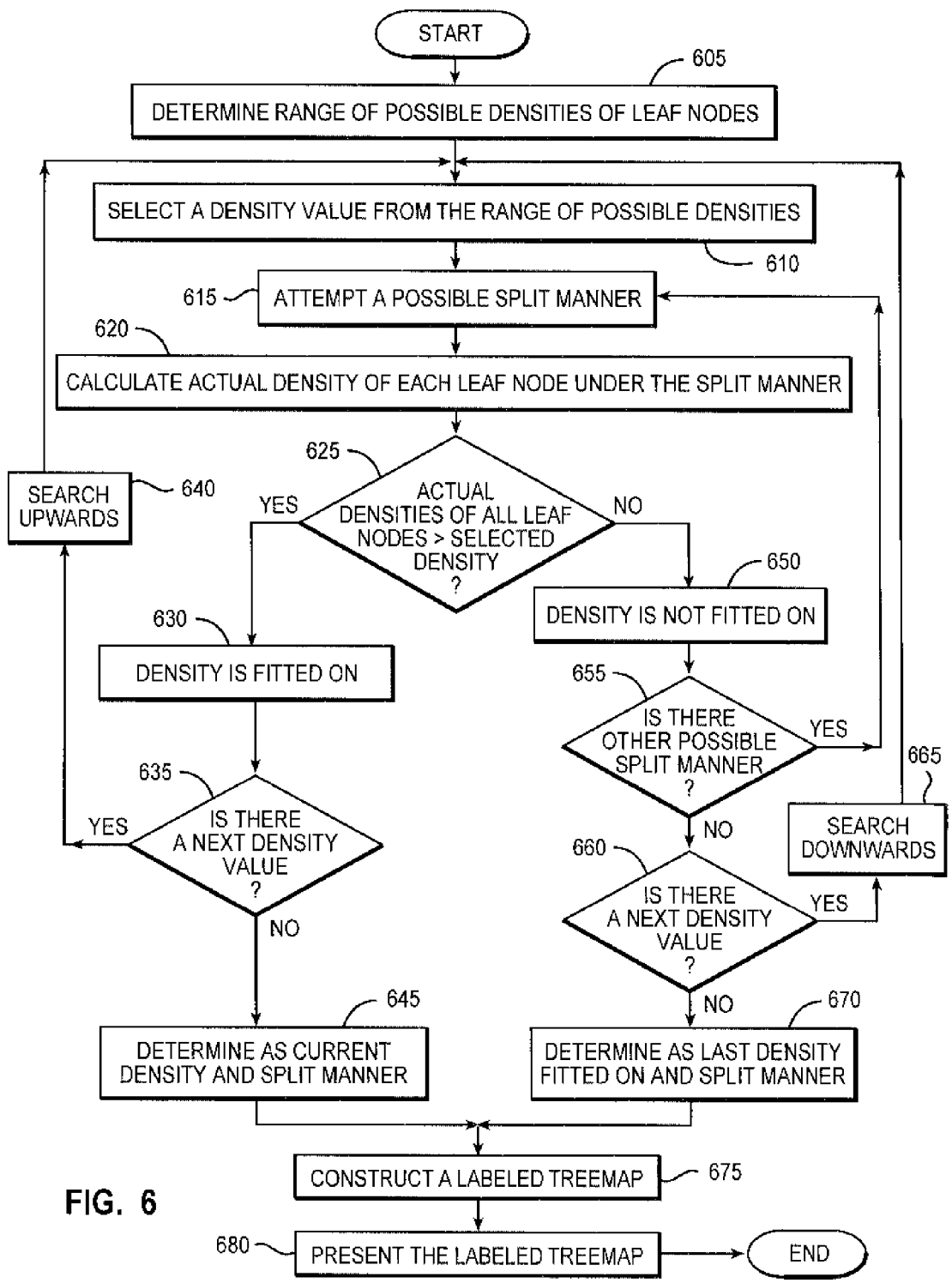
FIG. 6 shows a flowchart of a method for constructing a treemap with balanced layout according to an embodiment of the present invention.

FIG. 6 shows a flowchart of a method for constructing a labeled treemap with balanced layout according to an embodiment of the present invention.

As shown in FIG. 6, first in Step 605, a range of possible densities of leaf nodes is determined. In this step, prior to the determination of the range of possible densities of leaf nodes, the information concerning to the designated hierarchy and the information concerning to the designated treemap region used for visualizing the hierarchy is first obtained. Wherein, the information concerning to the designated hierarchy may comprise the weight, name, content etc. of each node, while the information concerning to the designated treemap region may comprise the size, position etc. of the designated region.

It should be noted that treemap is a visualization technique designed for weighted tree. In a weighted tree, each node is associated with a weight. Furthermore, a weighted tree satisfies such a property that the weight of each non-leaf node is the sum of the weights of its all child nodes.

In addition, as defined above, the density of a leaf node is the area of region in a labeled treemap on one unit of weight occupied by the leaf node. The bigger the density of leaf node is, the less space is available for border, spacing and padding in the treemap.

Based on such properties, it is easy to determine the range of possible densities of leaf node. In the present embodiment, the lower bound could be 0, and the upper bound could be the value resulting from dividing the sum of the weights of all leaf nodes in the designated hierarchy by the area of the designated space. In actual implementation, the upper bound could be calculated by dividing the weight of the root node by the area of the designated space.

Moreover, it should be understood that those skilled in the art may implement other ways for determining density range. For example, the lower bound may be set to some value between zero and the upper hound instead of zero. In conclusion, any way being capable of determining the appropriate density range are permitted.

Next, the following process is that for finding the maximum density that could be fitted on among the range of possible densities, and further finding a labeled treemap with balanced layout corresponding to the maximum density. It should be noted that, in the present embodiment, the objective of the following process is to find the tightest (maximum) upper bound of density that the nodes of designated hierarchy could have in corresponding labeled treemap, as well as a labeled treemap that could fit on the upper bound, i.e. the best density and labeled treemap of the present invention. In other embodiments, however, it may not to find such maximum density, but to find a density which can be fitted on and the corresponding labeled treemap only, which can also achieve the objective of the present invention.

First, in Step 610, a possible density value is selected from the range of possible densities. This step is implemented based on the binary search method. When performed for the first time, this step will select a density value located at the middle of the density range according to the binary search method. Then in each time of performance afterwards, this step will determine the search range according to the binary search method, towards the upper bound or the lower bound in the last density range based on a determination result, then further select a density value located at the middle of the search range.

Then, in Step 615, according to above hierarchy, a possible splitting manner for constructing a labeled treemap corresponding to such hierarchy is attempted with respect to the designated rectangle region. Wherein, the above-mentioned rectangle region is not only referred to the corresponding region of the root node, but also to the corresponding region of any non-leaf node in the designated hierarchy. Furthermore, said splitting manner comprises not only the split of node regions, but also the split of regions of border, padding, spacing, etc.

The objective of this step is to provide candidate splitting manners, among which it is determined which one is able to construct a labeled treemap that fits on the density value selected in Step 610. As defined above, "fit on" is referred to that the area of region occupied by each leaf node in the labeled treemap is at least the product of the weight of the node and the density. That is, the area of region occupied by each leaf node in the labeled treemap should be approximately corresponding to the weight of the node.

Then, in Step 620, for the currently attempted possible splitting manner, the actual density of each leaf node under such splitting manner is calculated by dividing the actual area of region assigned to the leaf node by the weight of the node.

In Step 625, it is determined whether the actual densities of all leaf nodes are larger than or equal to the density value selected in Step 610. If so, the process proceeds to Step 630. It should be noted that if the actual density of a certain leaf node is less than the selected density value through the determination, this step can be terminated without continuing to compare actual densities of other leaf nodes. This step is done by utilizing the above "fit on" definition.

Then, in Step 630, it is determined that the current selected density value can be fitted on by the current splitting manner that is, the current splitting manner is able to construct a labeled treemap that fits on the density value. The determination is made based on the above "fit on" definition. Furthermore, with respect to the density determined could be fitted on, it is not necessary to attempt other splitting manners, and the next step proceeds so as to save processing time.

In Step 635, it is determined whether there exists another density value available for selecting in above-mentioned range of possible densities. That is to say, in this step, it is determined, according to the definition of binary search method, whether the range on which the binary search method is performed is reduced to contain no any other density value. If there is other density value, the process proceeds to Step 640.

In Step 640, the direction towards which the next search is performed on the range is determined as that of search upwards. That is, it is determined that the next search will be performed on a range within the range of possible densities, in which densities are larger than the current selected density value. In the case of binary search method, the range on which the next binary search will be performed is that between the last fitted on density value and the current selected density value in the range of possible densities. This is determined according to the definition of binary search method.

It should be noted that this step is on the basis of the following facts:

1. Given a weighted tree and a set of treemaps, if there exists a treemap that is fit on a density $\rho$, then for every $\rho'<\rho$, there also exists a treemap that fit on $\rho'$;

2. Given a weighted tree and a set of treemaps, if there does not exist a treemap that is fit on a density $\rho$, then for every $\rho'>\rho$, there does not exist a treemap that fit on $\rho'$ neither.

The above facts capture the monotone properties of fitness. Based on the above two facts, it may be concluded that if there is some density greater than zero that could be fitted on by some treemap, there must exist an upper bound of the set of densities which could be fitted on, i.e. the best fit density.

Therefore, for the range of possible densities, if the current selected density value could be fitted on, it is not necessary to continue to search on the range thereof, in which densities are smaller than the current selected density value, but it is only needed to continue to search the range thereof, in which densities are larger than the current selected density value for the density value that could be fitted on, so as to eventually find a maximum value among such density values that could be fitted on, which is the best fitting density to be found in the present invention.

After the direction of the next search is determined as that of search upwards and a new range of possible densities is determined in Step 640, Step 610 and the follow-up steps are to be performed.

Now turning back to Step 635, if there is no other density value for selecting, then in Step 645, the current selected density value that could be fitted on is determined as the best density to be found, i.e. the maximum density that could be fitted on, and the current splitting manner is determined as the splitting manner that is able to construct a best labeled treemap.

On the contrary, if not the actual densities of all leaf nodes are larger than or equal to the selected density value, then in Step 650, it is determined that the current splitting manner is not able to construct a labeled treemap that could fit on the selected density.

Then, in Step 655, it is determined whether there is other splitting manner with respect to the above designated treemap region. If there is, the process proceeds to Step 615, attempting another possible splitting manner; if there is not, the process proceeds to Step 660.

In Step 660, it is determined whether there is other density value for selecting in the above range of possible densities. That is, in this step, it is determined, by utilizing the definition of binary search method, whether the range of binary search is reduced to contain no any other density value. If so, then the process proceeds to Step 665.

In Step 665, the direction of the next search is determined as that of search downwards. That is, it is determined that the next search will be performed on a range within the range of possible densities, in which densities are smaller than the current selected density value. In the case of binary search method, the range on which the next binary search will be performed is the range between the last fitting density value and the current selected density value within the range of possible densities. This is also determined by utilizing the definition of binary search method.

As mentioned above, this step is on the basis of the following facts:

1. Given a weighted tree and a set of treemaps, if there exists a treemap that is fit on a density ρ, then for every ρ'<ρ, there also exists a treemap that fit on ρ';

2. Given a weighted tree and a set of treemaps, if there does not exist a treemap that is fit on a density ρ, then for every ρ'>ρ, there does not exist a treemap that fit on ρ' neither.

Therefore, for the range of possible densities, if the current selected density value could not be fitted on, it is not necessary to continue to search on a range thereof, in which densities are larger than the current selected density value, but it is only needed to continue to search the range thereof, in which densities are smaller than the current selected density value for the density value that could be fitted on, so as to eventually find a maximum value among such density values that could be fitted on.

Similarly, after the direction of the next search is determined as that of search downwards and a new possible density range is determines in Step 665, Step 610 and the follow-up steps are to be performed.

Now turning back to Step 660, if there is no other density value for selecting, then in Step 670, the last fitting density value is determined as the best density to be found, i.e. the maximum density that could be fitted on, and the splitting manner that could fit on such density is determined as the splitting manner that is able to construct a best labeled treemap.

Then in Step 675, the corresponding labeled treemap is constructed by the splitting manner determined in Step 645 or Step 670. This step could be implemented by utilizing any of existing treemap layout algorithms. There are a plurality of available existing treemap layout algorithms, such as the split algorithm etc.

In Step 680, the labeled treemap is presented. In this step, the labeled treemap constructed in Step 675 is presented on the designated display region as the best treemap of the above-mentioned hierarchy. This step is also implemented by utilizing any existing treemap depiction method, whose detailed descriptions are omitted herein.

By such way, in the present embodiment, for each selected density instance, it is attempted to determine whether there is a labeled treemap that could fit on it, so as to find a best fitting density and its corresponding best labeled treemap.

The detailed description of the method for constructing a labeled treemap with balanced layout of the present embodiment is as above. It should be noted that the above embodiment is only illustrative, and some steps may be added or deleted, or some steps therein may be combined to perform without departing from the general concept of the present invention. In addition, in the present embodiment, the best density is find out by utilizing the binary search method. However, any other search method are allowed as long as the objective of the present invention could be achieved, all of which are within the protective scope of the present invention.

A specific implementation of the combination of the present invention and the most popular treemap layout algorithm, i.e. split algorithm, is given below.

Given ρ and a set of sibling nodes A as well as a rectangle region R, the algorithm Calc(A, R) to answer if ρ can be fitted on is described as follows. Wherein, R° represents the internal rectangle region of R as shown in FIG. 4.

1. If A contains only one non-leaf node u, then return Calc(B, R°), where B is the set of sub nodes of u;

2. If A contains only one leaf node u, then calculate the actual density value of the area of region per unit of weight occupied by it. If the actual density value is smaller than p, then map u to R and return true else return false;

3. Split the set of nodes A into two parts $A_1$ and $A_2$ with the sums of the weights of them being approximately equal;

4. Try all possible splitting manners on the longer edge of R° to split it into two sub rectangle regions $R_1$ and $R_2$;

a) Call Calc($A_1$, $R_1$) and Calc($A_2$, $R_2$) recursively;

b) If both return true, then return true;

5. Return false.

Figure 7:
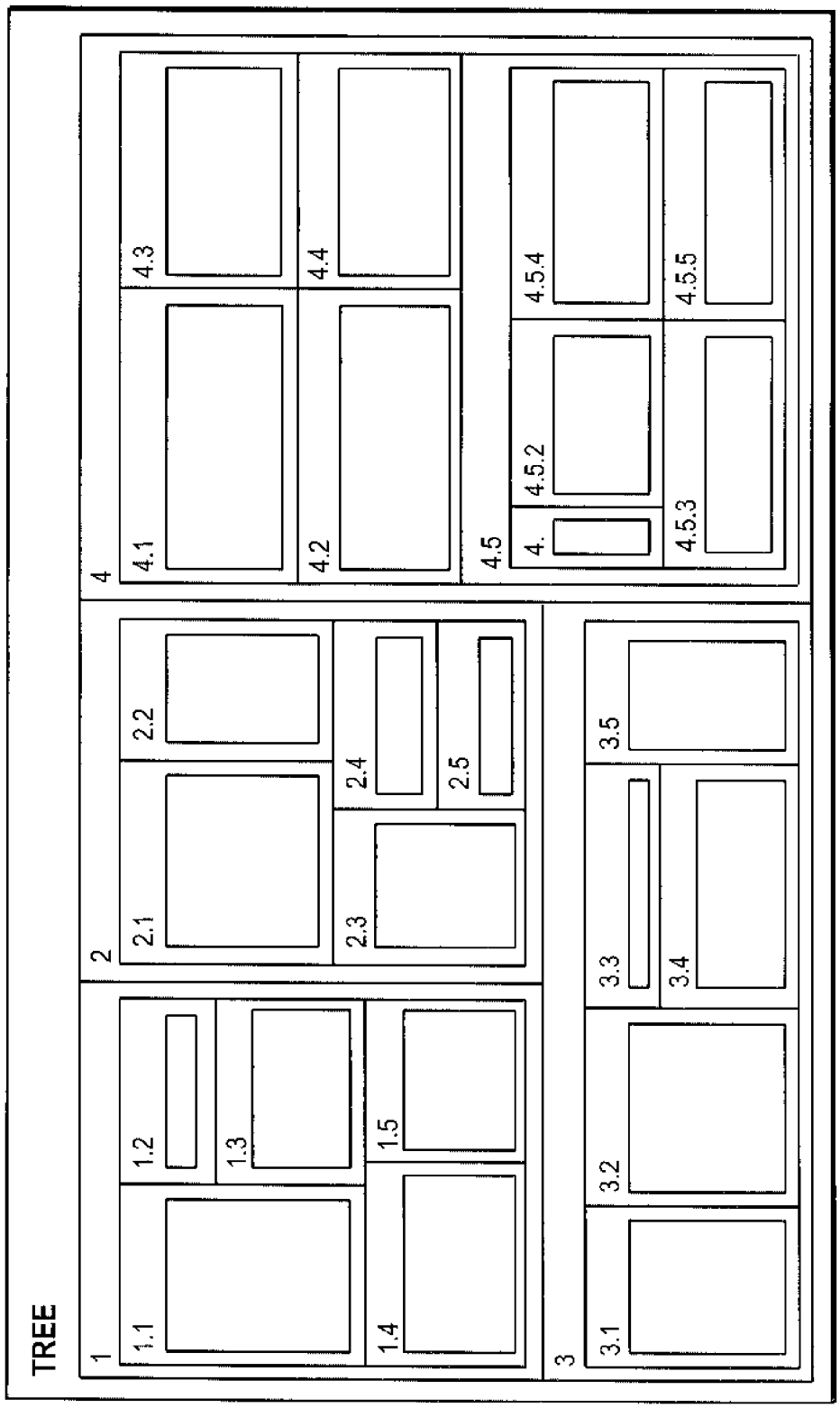
FIG. 7 shows an example of a treemap constructed by utilizing the method for constructing a treemap with balanced layout of the present invention.

FIG. 7 shows an example of a labeled treemap constructed by utilizing the method for constructing a labeled treemap with balanced layout of the present invention. It should be noted that the hierarchy presented by the labeled treemap in FIG. 7 is the same as that presented by the labeled treemap generated by the existing treemap layout method in FIG. 5. Through comparison, however, it may be seen that the child node "3.3" and the child node "4.5.1" are shown in the labeled treemap constructed by the present invention.

Therefore, in the labeled treemap constructed by the method of the present invention, the area of region occupied by each leaf node is approximately in proportion to its weight, and the case of invisible leaf node will not occur in the constructed labeled treemap.

Under the same inventive concept, a system for constructing a labeled treemap with balanced layout is proposed by the present invention. The system for constructing a labeled treemap with balanced layout will be described in detail below in conjunction with the accompanying figures.

Figure 8:
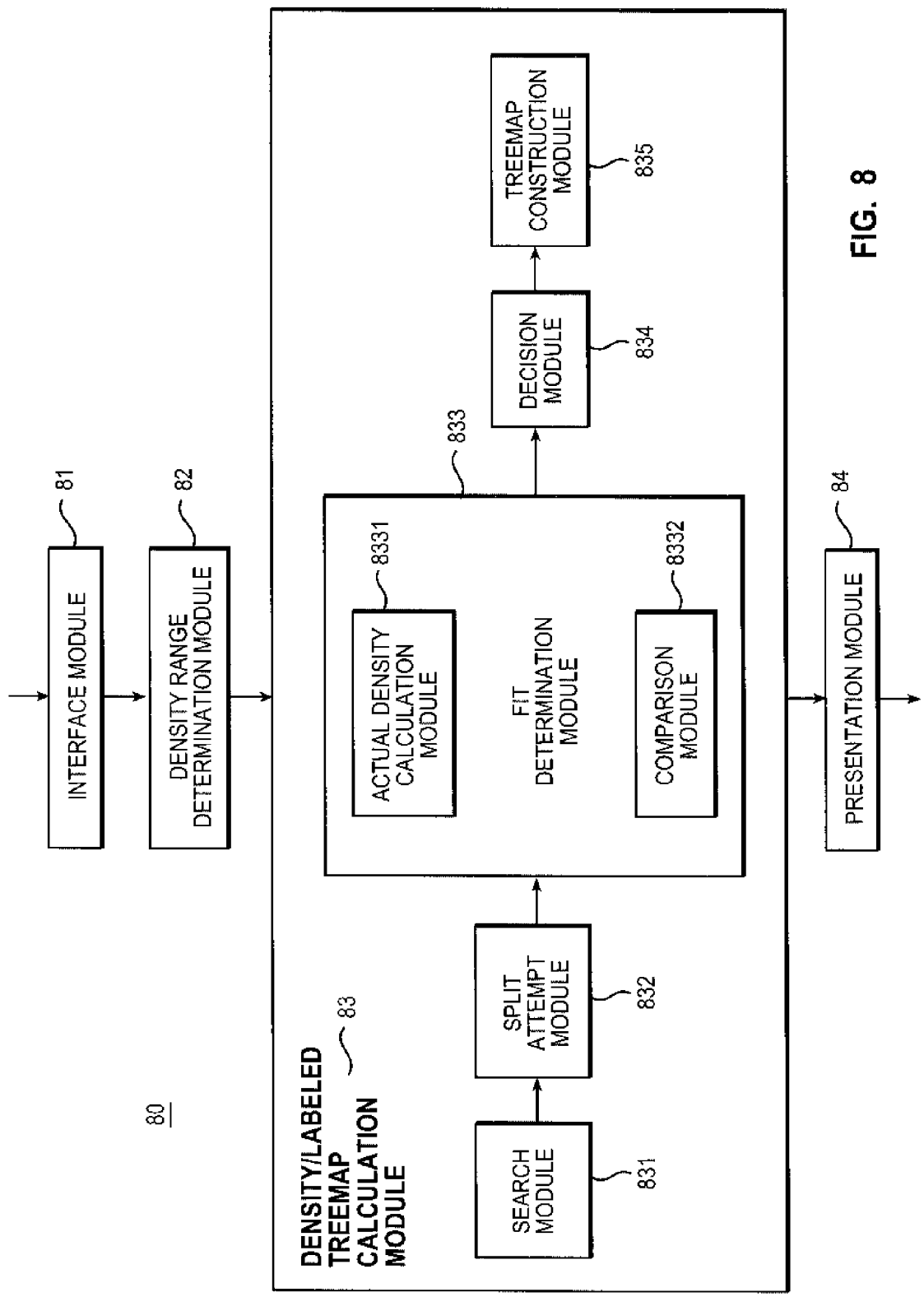
FIG. 8 shows a block diagram of a system for constructing a treemap with balanced layout according to an embodiment of the present invention.

FIG. 8 shows a block diagram of a system for constructing a labeled treemap with balanced layout according to an embodiment of the present invention. As shown in FIG. 8, the system 80 for constructing a labeled treemap with balanced layout of the present embodiment comprises an interface module 81, a density range determination module 82, a density/labeled treemap calculation module 83, and a presentation module 84.

The interface module 81 obtains from outsides the information concerning to a designated hierarchy and the information concerning to a designated treemap region used for visualizing the hierarchy. Wherein, the information concerning to the designated hierarchy may comprise the weight, name, content of each node, while the information concerning to the designated treemap region may comprise the size, position of the designated region.

The density range determination module 82 determines the range of possible densities of leaf node based on the information concerning to the designated hierarchy and the designated treemap region obtained from the interface module 81. In the present embodiment, the density range determination module 82 set the lower bound of the range of possible densities to 0, and the upper bound to the value resulting from dividing the sum of the weights of all leaf nodes in the hierarchy by the area of the designated treemap region. In a weighted tree, since the weight of the root node is equal to the sum of the weights of its all leaf nodes, the upper bound could be calculated by dividing the weight of the root node by the area of the designated treemap region.

The density/labeled treemap calculation module 83 searches the range of possible densities determined by the density range determination module for a maximum density that could be fitted on and a labeled treemap with a layout that could fit on the maximum density.

As shown in FIG. 8, the density/labeled treemap calculation module 83 further comprises a search module 831, a splitting attempt module 832, a fit determination module 833, a decision module 834, and a treemap construction module 835.

The search module 831 selects a possible density value among the range of possible densities determined by the density range determination module 82 each time by using the binary search method and passes it to the fit determination module 833. In addition, when there does not exist a next density value for selecting in the range of possible densities, the search module 831 notifies the decision module 834 of such condition.

The splitting attempt module 832 attempts, based on above hierarchy, possible splitting manners for constructing a labeled treemap corresponding to such hierarchy. The possible splitting manners comprise not only the split of the node regions, but also the split of regions of border, padding, spacing, etc. It should be noted that the splitting attempt module 832 needs to attempt a plurality of different splitting manners to provide a plurality of candidate splitting manners, among which it is determined which one is able to construct a labeled treemap that fits on a selected density value.

The fit determination module 833 determines whether the possible splitting manners attempted by the splitting attempt module 832 can construct a labeled treemap that could fit on the density value selected by the search module 831. As shown in FIG. 8, the fit determination module 833 further comprises an actual density calculation module 8331 and a comparison module 8332.

The actual density calculation module 8331 calculates the actual density of each leaf node with respect to each of the possible splitting manners attempted by the splitting attempt module 832 by dividing the actual area of region divided to the leaf node by the weight of the node.

The comparison module 8332 determines, with respect to each of the above possible splitting manners, whether the actual densities of all leaf nodes are larger than or equal to the selected density value under the current splitting manner by comparing the actual density of each leaf node to the density value selected by the search module 831. If so, it is determined that the current splitting manner is able to construct a labeled treemap that fits on the density value, and such determination result and the information about the current splitting manner are notified to the decision module 834.

The decision module 834 makes a decision based on the result of the fit determination module 833. In particular, if there exists a splitting manner that is able to construct a labeled treemap that could fit on said density value among the splitting manners attempted by the splitting attempt module 832, then it determines that the selected density value could be fitted on, and notifies the search module 831 to continue to search towards the upper bound; otherwise, it determines the density could not be fitted on, and notifies the search module 831 to continue to search towards the lower bound. Additionally, when receiving a notification sent from the search module 831 that there does not exist next density value for selecting in the range of possible densities, the decision module 834 determines the last density value determined could be fitted on as the best value, and notifies the treemap construction module 835 of the splitting manner that could fit on the best density value.

The treemap construction module 835 constructs a labeled treemap corresponding to the above hierarchy in the above designated treemap region according to the splitting manner determined by the decision module 834. It should be noted that the treemap construction module 835 may be implemented by utilizing any of existing treemap layout algorithms, such as split algorithm.

In addition, with respect to the search module 831, when the decision module 834 directs it to search towards the upper bound, it searches in the range within the range of possible densities, in which densities are larger than the current selected density value; when the decision module 834 directs it to search towards the lower bound, the search module 831 searches in the range within the range of possible densities, in which densities are smaller than the current selected density value.

Wherein, the last density value determined could be fitted on when the search module 831 completes the search to the whole range of possible densities is the maximum density that could be fit on in the above range of possible densities, i.e. the best density mentioned above, while the labeled treemap constructed by the splitting manner that could fit on such maximum density is the best labeled treemap to be found in the present invention.

Then, the presentation module 84 presents the labeled treemap found by the density/labeled treemap calculation module 83 on the designated display region as the best labeled treemap of the above-mentioned hierarchy.

Hereinbefore the detailed description of the system for constructing a labeled treemap with balanced layout of the present embodiment is proposed. As those skilled in the art may have seen, the present invention may be embodied as a method, a system, and/or a computer program product. Therefore, the present invention may be implemented in the form of entire hardware, the form of entire software, or the form of a combination of hardware and software. In addition, the present invention may be provided as a computer program product in computer-usable storage medium, which have computer-usable program codes embodied therein. Any suitable computer-usable medium may be employed, including: hard drives, CD-ROMs, optical or magnetic storage devices. Furthermore, it is understood that each block in the block diagrams/flowcharts as well as a combination of some blocks in the block diagrams and flowcharts may be implemented with some computer program instructions. These computer program instructions may be provided to a general-purpose computer, a specialized computer, or the processor of another programmable data processing device to produce a machine, such that these instructions create means for implementing the functions specified in the block diagrams and/or flowcharts or the blocks through the execution thereof by the processor of the computer or another programmable data processing device.

Although a method and system for constructing a labeled treemap with balanced layout of the present invention have been described in detail through some exemplary embodiments, these embodiments are not exhaustive. Those skilled in the art can make various variations therein and modifications within the spirit and scope of the present invention.

The invention claimed is:

1. A method for constructing a labeled treemap with balanced layout, the method comprising:
   determining a range of possible densities of leaf nodes based on designated weights of the leaf nodes in a hierarchy and a designated treemap region, wherein the density of a leaf node is the area of region on one unit of weight occupied by the leaf node, and wherein the weight of the leaf node is relative to an amount of important information in the leaf node relative to all leaf nodes in the hierarchy, wherein said determining said range of possible densities of leaf nodes based on designated weights of the leaf nodes in a hierarchy and a designated treemap region further comprises:
      setting a lower bound of the range of possible densities as zero; and
      setting an upper bound of the range of possible densities as the value obtained by dividing the area of the designated treemap region by the sum of the weights of all leaf nodes in the hierarchy;
   searching the range of possible densities for a density that could be fitted on and a labeled treemap that could fit on the density, wherein said density that could be fitted on denotes that there is at least a labeled treemap for the density in which the area of region occupied by each leaf node is at least the product of the weight of the node and the density; and
   presenting the labeled treemap on the specified display region.

2. The method for constructing a labeled treemap with balanced layout according to claim 1, wherein said searching the range of possible densities further comprises:
   searching the range of possible densities for a maximum density that could be fitted on and a labeled treemap that could fit on the maximum density.

3. The method for constructing a labeled treemap with balanced layout according to claim 1, wherein said searching the range of possible densities further comprises:
   selecting a density from the range of possible densities;
   attempting, based on the hierarchy, possible splitting manners for constructing a labeled treemap with respect to the designated treemap region;
   determining whether one of the possible splitting manners is able to construct a labeled treemap that could fit on the density;
   in response to determining that one of the possible splitting manners is able to construct a labeled treemap that could fit on the density, constructing a labeled treemap utilizing the splitting manner, wherein the density and the labeled treemap is the result of said searching; and
   in response to determining that one of the possible splitting manners is able to construct a labeled treemap that could fit on the density, continuing to search the range of possible densities.

4. The method for constructing a labeled treemap with balanced layout according to claim 2, wherein searching the range of possible densities further comprises:
   selecting, by using a search method, a density from the range of possible densities;
   attempting, based on the hierarchy, a splitting manner from one or more possible splitting manners for constructing a labeled treemap with respect to the designated treemap region;
   determining whether the splitting manner is able to construct a labeled treemap that could fit on the selected density;
   in response to determining the splitting manner is able to construct a labeled treemap that could fit on the density:
      determining if another density is available to select from the range of possible densities;
      in response to determining if another density is available to select from the range of possible densities, continuing to search in the range of possible densities towards an upper bound; and
      in response to determining if no other density is available to select from the range of possible densities, setting a currently selected density as the best density;
   in response to determining the splitting manner is not able to construct a labeled treemap that could fit on the density:
      determining if another density is available to select from the range of possible densities;
      in response to determining if another density is available to select from the range of possible densities, searching in the range of possible densities towards a lower bound; and
      in response to determining that there is no other density available to select from the range of possible densities, setting the currently selected density as the best density; and
   constructing the labeled treemap in accordance with the splitting manner and the best density.

5. The method for constructing a labeled treemap with balanced layout according to claim 4, wherein the search method is a binary search method.

6. A system comprising:
   a processor;
   program instructions executing on the processor to cause the system to perform functions of constructing a labeled treemap with balanced layout, wherein the system:
   determines a range of possible densities of leaf nodes based on designated weights of the leaf nodes in a hierarchy and a designated treemap region, wherein the density of a leaf node is the area of region on one unit of weight occupied by the leaf node, and wherein the weight of the leaf node is relative to an amount of important information in the leaf node relative to all leaf nodes in the hierarchy, wherein in determining said range of possible densities of leaf nodes based on designated weights of the leaf nodes in a hierarchy and a designated treemap region, the system further:
   sets a lower bound of the range of possible densities as zero; and
   sets an upper bound of the range of possible densities as the value obtained by dividing the area of the designated treemap region by the sum of the weights of all leaf nodes in the hierarchy;
   searches the range of possible densities determined by the density range determination module for a density that could be fitted on and a labeled treemap that could fit on the density, wherein said density that could be fitted on denotes that there is at least a labeled treemap for the density in which the area of region occupied by each leaf node is at least the product of the weight of the node and the density; and presents the labeled treemap determined by the density/labeled treemap calculation module on the specified display region.

7. The system for constructing a labeled treemap with balanced layout according to claim 6, wherein the program instructions by which the system searches the range of possible densities further comprise program instructions that cause the system to search the range of possible densities determined by the density range determination module for a maximum density that could be fitted on and a labeled treemap that could fit on the maximum density.

8. The system for constructing a labeled treemap with balanced layout according to claim 6, wherein the program instructions by which the system searches the range of possible densities further comprise program instructions that cause the system to:
select a density form the range of possible densities each time;
attempt, based on the hierarchy, one or more possible splitting manners for constructing a labeled treemap with respect to the designated treemap region;
determine whether one of the one or more possible splitting manners attempted by the splitting attempt module can construct a labeled treemap that could fit on the density;
construct a labeled treemap utilizing the splitting manner continues to search the range of possible densities; and
construct a labeled treemap corresponding to the hierarchy in the designated treemap region according to the splitting manner, wherein the density and the labeled treemap is the result of the searching.

9. The system for constructing a labeled treemap with balanced layout according to claim 7, wherein the program instructions by which the system searches the range of possible densities further comprise program instructions that cause the system to:
select a density from the range of possible densities using a search method;
attempt, based on the hierarchy, a splitting manner from one or more possible splitting manners for constructing a labeled treemap with respect to the designated treemap region;
determine whether the splitting manner is able to construct a labeled treemap that could fit on the selected density;
in response to determining the splitting manner is able to construct a labeled treemap that could fit on the selected density:
    determine if another density is available to select from the range of possible densities;
    in response to determining that another density is available to select from the range of possible densities, continuing to search in the range of possible densities towards an upper bound; and
    in response to determining if no other density is available to select from the range of possible densities, set a currently selected density as the best density;
in response to determining the splitting manner is not able to construct a labeled treemap that could fit on the density:
    determine if another density is available to select from the range of possible densities;
    in response to determining that another density is available to select from the range of possible densities, search in the range of possible densities for a lower bound; and
    in response to determining that no other density is available to select from the range of possible densities, set the currently selected density as the best density; and
construct the labeled treemap in accordance with the splitting manner and the best density.

10. The system for constructing a labeled treemap with balanced layout according to claim 9, wherein the search method is a binary search method.

11. A computer program product comprising a non-transitory computer program product in a computer-usable storage medium having functionally descriptive material that, when executed by a computer, causes the computer to perform actions that include:
determining a range of possible densities of leaf nodes based on designated weights of the leaf nodes in a hierarchy and a designated treemap region, wherein the density of a leaf node is the area of region on one unit of weight occupied by the leaf node, and wherein the weight of the leaf node is relative to an amount of important information in the leaf node relative to all leaf nodes in the hierarchy, wherein said determining said range of possible densities of leaf nodes based on designated weights of the leaf nodes in a hierarchy and a designated treemap region further comprises:
setting a lower bound of the range of possible densities as zero; and
setting an upper bound of the range of possible densities as the value obtained by dividing the area of the designated treemap region by the sum of the weights of all leaf nodes in the hierarchy;
searching the range of possible densities for a density that could be fitted on and a labeled treemap that could fit on the density, wherein said density that could be fitted on denotes that there is at least a labeled treemap for the density in which the area of region occupied by each leaf node is at least the product of the weight of the node and the density; and
presenting the labeled treemap on the specified display region.

12. The computer program product of claim 11, wherein the searching the range of possible densities further comprises searching the range of possible densities for a maximum density that could be fitted on and a labeled treemap that could fit on the maximum density.

13. The computer program product of claim 12, wherein the searching the range of possible densities further comprises:
selecting a density from the range of possible densities;
attempting, based on the hierarchy, possible splitting manners for constructing a labeled treemap with respect to the designated treemap region;
determining whether one of the possible splitting manners is able to construct a labeled treemap that could fit on the density;
in response to determining that one of the possible splitting manners is able to construct a labeled treemap that could fit on the density, constructing a labeled treemap utilizing the splitting manner, wherein the density and the labeled treemap is the result of the searching; and
in response to determining that one of the possible splitting manners is able to construct a labeled treemap that could fit on the density, continuing to search the range of possible densities.

14. The computer program product of claim 12, wherein the searching is performed by a binary search method.

15. The computer program product of claim 12, wherein searching the range of possible densities further comprises:
- selecting a density from the range of possible densities, using a search method;
- attempting, based on the hierarchy, a splitting manner from one or more possible splitting manners for constructing a labeled treemap with respect to the designated treemap region;
- determining whether the splitting manner is able to construct a labeled treemap that could fit on the selected density;
- in response to determining the splitting manner is able to construct a labeled treemap that could fit on the density:
  - determining if another density is available to select from the range of possible densities;
  - in response to determining that another density is available to select from the range of possible densities, continue searching in the range of possible densities towards an upper bound; and
  - in response to determining that no other density is available to select from the range of possible densities, setting a currently selected density as the best density; and
- constructing the labeled treemap in accordance with the splitting manner and the best density.

16. The computer program product of claim 15, wherein the searching further comprises:
- in response to determining the splitting manner is not able to construct a labeled treemap that could fit on the density:
  - determining if another density is available to select from the range of possible densities;
  - in response to determining that another density is available to select from the range of possible densities, searching in the range of possible densities towards a lower bound; and
  - in response to determining that no other density is available to select from the range of possible densities, setting the currently selected density as the best density.

* * * * *